United States Patent
Adachi et al.

(10) Patent No.: US 10,766,357 B2
(45) Date of Patent: Sep. 8, 2020

(54) FUEL SUPPLY DEVICE AND METHOD FOR PRODUCING SAME

(71) Applicant: DENSO CORPORATION, Kariya, Aichi-pref. (JP)

(72) Inventors: Rui Adachi, Kariya (JP); Kiyomori Kobayashi, Kariya (JP); Norihiro Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 172 days.

(21) Appl. No.: 16/080,326

(22) PCT Filed: Feb. 24, 2017

(86) PCT No.: PCT/JP2017/006969
§ 371 (c)(1),
(2) Date: Aug. 28, 2018

(87) PCT Pub. No.: WO2017/159278
PCT Pub. Date: Sep. 21, 2017

(65) Prior Publication Data
US 2019/0009670 A1    Jan. 10, 2019

(30) Foreign Application Priority Data
Mar. 18, 2016 (JP) ................. 2016-055978

(51) Int. Cl.
*B60K 15/03* (2006.01)
*F02M 37/20* (2006.01)
(Continued)

(52) U.S. Cl.
CPC .............. *B60K 15/03* (2013.01); *B60K 15/01* (2013.01); *B60K 15/035* (2013.01);
(Continued)

(58) Field of Classification Search
CPC ...... B60K 15/03; B60K 15/035; B60K 15/01; B60K 2015/03542; B60K 2015/03243;
(Continued)

(56) References Cited

U.S. PATENT DOCUMENTS 5,584,988 A * 12/1996 Hashimoto ............ B01D 29/15
210/136
5,728,292 A *  3/1998 Hashimoto ............ B01D 29/15
210/136
(Continued)

FOREIGN PATENT DOCUMENTS

JP          5302907      10/2013
JP       2013-227929    11/2013

*Primary Examiner* — Hung Q Nguyen
*Assistant Examiner* — Susan E Scharpf
(74) *Attorney, Agent, or Firm* — Nixon & Vanderhye PC (57) ABSTRACT

In a fuel tank, a pressure regulator is placed at an outside of a sub-tank and regulates a pressure of fuel of a pressure-regulation path, which is discharged from a fuel pump and is fed toward an outside of the fuel tank. A fuel recovery passage portion recovers excess fuel, which becomes excess at the pressure-regulation path, to the sub-tank. The sub-tank has an opening at a location that is higher than the suction filter. The fuel recovery passage portion is inserted from the outside of the sub-tank into the inside of the sub-tank through the opening while a gap is formed between the fuel recovery passage portion and the opening, so that the fuel recovery passage portion has an excess fuel outlet that discharges the excess fuel at a location that is on an inner side of the opening where an inside of the sub-tank is placed.

12 Claims, 8 Drawing Sheets

(51) Int. Cl.
*F02M 37/50* (2019.01)
*F02M 37/00* (2006.01)
*B60K 15/01* (2006.01)
*B60K 15/035* (2006.01)
*F02M 37/10* (2006.01)
*F02M 37/22* (2019.01)

(52) U.S. Cl.
CPC .... *F02M 37/0029* (2013.01); *F02M 37/0052* (2013.01); *F02M 37/106* (2013.01); *F02M 37/20* (2013.01); *F02M 37/22* (2013.01); *F02M 37/50* (2019.01); *B60K 2015/03236* (2013.01); *B60K 2015/03243* (2013.01); *B60K 2015/03296* (2013.01); *B60K 2015/03523* (2013.01); *B60K 2015/03542* (2013.01)

(58) Field of Classification Search
CPC ........... B60K 2015/03523; B60K 2015/03296; B60K 2015/03236; F02M 37/0029; F02M 37/50; F02M 37/22; F02M 37/106; F02M 37/0052; F02M 37/20
See application file for complete search history.

(56) References Cited

U.S. PATENT DOCUMENTS

| | | | | |
|---|---|---|---|---|
| 5,769,061 A | * | 6/1998 | Nagata | B01D 35/26 123/509 |
| 5,782,223 A | * | 7/1998 | Yamashita | F02M 37/10 123/510 |
| 6,241,883 B1 | * | 6/2001 | Noda | B01D 35/027 210/172.3 |
| 2002/0046739 A1 | * | 4/2002 | Okada | F02M 25/089 123/518 |
| 2005/0155583 A1 | * | 7/2005 | Mitsudou | F02M 37/103 123/509 |
| 2005/0274361 A1 | * | 12/2005 | Ikeya | F02M 69/54 123/457 |
| 2011/0132825 A1 | * | 6/2011 | Nishio | F02M 37/44 210/172.4 |
| 2016/0115919 A1 | * | 4/2016 | Nishio | F02M 37/50 210/416.4 |
| 2019/0078541 A1 | * | 3/2019 | Kobayashi | F02M 37/10 |

* cited by examiner

FUEL SUPPLY DEVICE AND METHOD FOR PRODUCING SAME

CROSS REFERENCE TO RELATED APPLICATION

This application is the U.S. national phase of International Application No. PCT/JP2017/006969 filed Feb. 24, 2017, which designated the U.S. and claims priority to Japanese Patent Application No. 2016-55978 filed on Mar. 18, 2016, the entire contents of each of which are hereby incorporated by reference.

TECHNICAL FIELD

The present disclosure relates to a fuel supply device that is configured to supply fuel from an inside of a fuel tank of a vehicle to an outside of the fuel tank.

BACKGROUND ART

Previously, there is known a fuel supply device that is configured to supply fuel from an inside of a fuel tank of a vehicle to an outside of the fuel tank. The device, which is disclosed in the patent literature 1, includes a sub-tank, a suction filter, a fuel pump, a pressure regulator and a fuel recovery passage portion. The sub-tank stores the fuel. The fuel pump suctions the fuel, which is filtered through the suction filter placed along a bottom portion of the sub-tank. The pressure regulator, which is placed at the outside of the sub-tank, adjusts a pressure of fuel of a pressure-regulation path, which is discharged from the fuel pump and is fed toward the outside of the fuel tank. The fuel recovery passage portion recovers the excess fuel, which becomes excess at the pressure-regulation path, to the sub-tank.

An opening, which is referred to as an excess fuel inflow port, is formed at a peripheral surface of the sub-tank. The fuel recovery passage portion is formed by an excess fuel supply pipe that is in close contact with and is connected to the excess fuel inflow port. The fuel recovery passage portion discharges the excess fuel on the inner side of the opening where the inside of the sub-tank is placed.

In the fuel recovery passage portion of the patent literature 1, since the excess fuel supply pipe is in close contact with and is connected to the excess fuel inflow port, once vapor contained in the excess fuel enters the inside of the sub-tank, the vapor is less likely outputted to the outside of the sub-tank. When this vapor is suctioned into the fuel pump through the suction filter once again, the fuel supply stability is deteriorated.

CITATION LIST

Patent Literature

PATENT LITERATURE 1: JP2013-227929A

SUMMARY OF INVENTION

The present disclosure is made in view of the above disadvantage, and it is an objective of the present disclosure to provide a fuel supply device, which has a high stability with respect to fuel supply, and a method for producing the fuel supply device.

In order to achieve the above objective, according to a first aspect of the present disclosure, there is provided a fuel supply device configured to supply fuel, which is present in a fuel tank of a vehicle, to an outside of the fuel tank, the fuel supply device including:

a sub-tank that stores the fuel;

a suction filter that is placed along a bottom portion of the sub-tank and filters the fuel;

a fuel pump that suctions the fuel, which is filtered through the suction filter;

a pressure regulator that is placed at an outside of the sub-tank and regulates a pressure of the fuel of a pressure-regulation path, which is discharged from the fuel pump and is fed toward the outside of the fuel tank; and a fuel recovery passage portion that recovers excess fuel, which becomes excess at the pressure-regulation path, to the sub-tank, wherein:

the sub-tank has an opening that opens to the outside of the sub-tank at a location that is higher than the suction filter; and due to a state where the fuel recovery passage portion is inserted from the outside of the sub-tank into an inside of the sub-tank while a gap is interposed between the fuel recovery passage portion and the opening, the fuel recovery passage portion has an excess fuel outlet that discharges the excess fuel at a location that is on an inner side of the opening where the inside of the sub-tank is placed.

According to the first aspect of the present disclosure, the fuel recovery passage portion includes the excess fuel outlet that discharges the excess fuel and is located on the inner side of the opening where the inside of the sub-tank is placed. With the excess fuel outlet discussed above, it is possible to limit scattering of the excess fuel, which is discharged from the fuel pump toward the outside of the fuel tank and becomes excess at the pressure-regulation path, at the outside of the sub-tank, and thereby it is possible to efficiently recover the excess fuel into the inside of the sub-tank. In addition, the discharge of the excess fuel from the excess fuel outlet is implemented in the state where the fuel recovery passage portion is inserted into the opening from the outside of the sub-tank while the gap is formed between the excess fuel outlet and the opening. Therefore, even when the vapor contained in the excess fuel is discharged into the inside of the sub-tank, it is possible to expel the vapor to the outside of the sub-tank through the gap. Specifically, it is possible to limit the suctioning of the vapor into the fuel pump through the suction filter. Therefore, it is possible to provide the fuel supply device that has the high stability with respect to the fuel supply.

Furthermore, according to a second aspect of the present disclosure, there is provided a method for producing a fuel supply device that is configured to supply fuel, which is present in a fuel tank of a vehicle, to an outside of the fuel tank, the fuel supply device including:

a sub-tank that stores the fuel;

a suction filter that is placed along a bottom portion of the sub-tank and filters the fuel;

a fuel pump that suctions the fuel, which is filtered through the suction filter;

a pressure regulator that is placed at an outside of the sub-tank and regulates a pressure of the fuel of a pressure-regulation path discharged from the fuel pump and is fed toward the outside of the fuel tank; and a regulator holder that includes a fuel recovery passage portion, wherein the fuel recovery passage portion recovers excess fuel, which becomes excess at the pressure-regulation path, to the sub-tank, and the regulator holder holds the pressure regulator, wherein:

the sub-tank has an opening that opens at a location, which is higher than the suction filter; and the fuel recovery passage portion has an excess fuel outlet that discharges the excess fuel at a location that is on an inner side of the opening where an inside of the sub-tank is placed, the method including:

a holding step of holding the pressure regulator with the regulator holder by assembling the pressure regulator to the regulator holder; and an inserting step of inserting the fuel recovery passage portion through the opening such that a unit, which includes the regulator holder, is assembled to the sub-tank in a direction that coincides with an opening direction of the opening, so that the excess fuel outlet is inserted from the outside of the sub-tank into an inside of the sub-tank through the opening.

According to the second aspect of the present disclosure, the unit, which includes the regulator holder, is assembled to the sub-tank in the direction that coincides with the opening direction of the opening. In this way, the fuel recovery passage portion is inserted such that the excess fuel outlet is inserted from the outside of the sub-tank into the inside of the sub-tank through the opening. The placement of the pressure regulator relative to the sub-tank and the placement of the excess fuel outlet relative to the sub-tank can be implemented by the assembling in the single direction. Therefore, the fuel supply device, which has the high stability with respect to the fuel supply, can be easily provided.

BRIEF DESCRIPTION OF DRAWINGS

The present disclosure, together with additional objectives, features and advantages thereof, will be best understood from the following description in view of the accompanying drawings.

DESCRIPTION OF EMBODIMENTS

Hereinafter, various embodiments of the present disclosure will be described with reference to the drawings. In each of the following embodiments, corresponding elements may be indicated by the same reference signs to omit a redundant description of the corresponding elements. In a case where only a part of a structure is described in each of the following embodiments, the rest of the structure of the embodiment may be the same as that of the previously described one or more of the embodiments. Besides the explicitly described combination(s) of structural components in each of the following embodiments, the structural components of different embodiments may be partially combined even though such a combination(s) is not explicitly described as long as there is no problem.

First Embodiment

Figure 1:
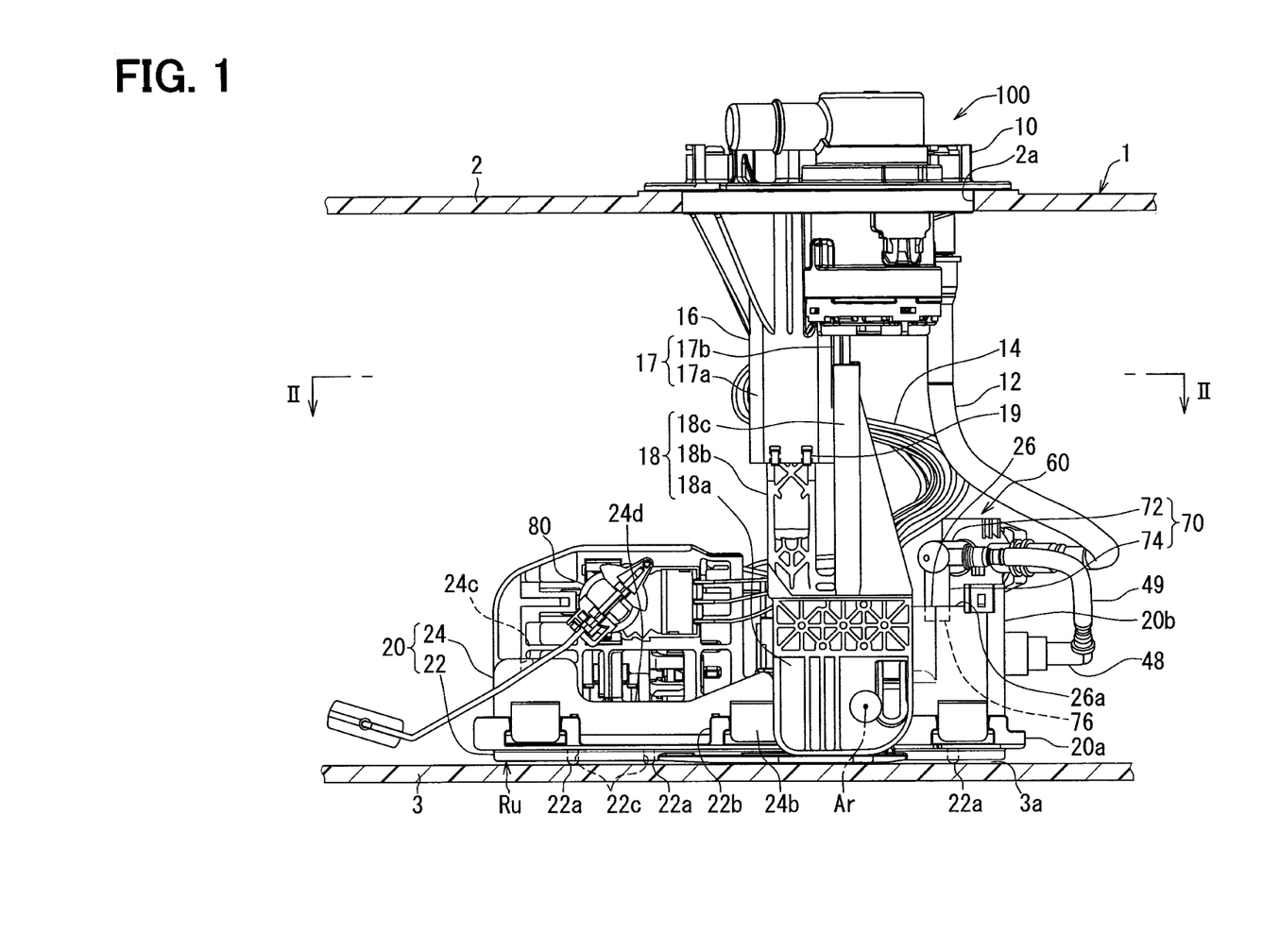
FIG. 1 is a front view showing a fuel supply device according to a first embodiment.

As shown in FIG. 1, a fuel supply device 100 according to a first embodiment of the present disclosure is installed in a fuel tank 1 of a vehicle and is applied to an internal combustion engine of the vehicle. The fuel supply device 100 supplies fuel stored in the fuel tank 1 to the internal combustion engine located at an outside of the fuel tank 1. Here, the fuel tank 1 is made of resin or metal and is shaped into a hollow form. An insertion hole 2a extends through an upper wall 2 of the fuel tank 1. The fuel supply device 100 is inserted into an inside of the fuel tank 1 through the insertion hole 2a. Under the above-described inserted state, the internal combustion engine, which is a supply destination of the fuel from the fuel supply device 100, may be a gasoline engine or a diesel engine. A top-to-bottom direction and a transverse(s) direction of FIG. 1, which shows an installed state of the fuel supply device 100 in the fuel tank 1, substantially coincide with a vertical direction and a horizontal direction(s), respectively, of the vehicle placed on a horizontal plane.

Figure 2:
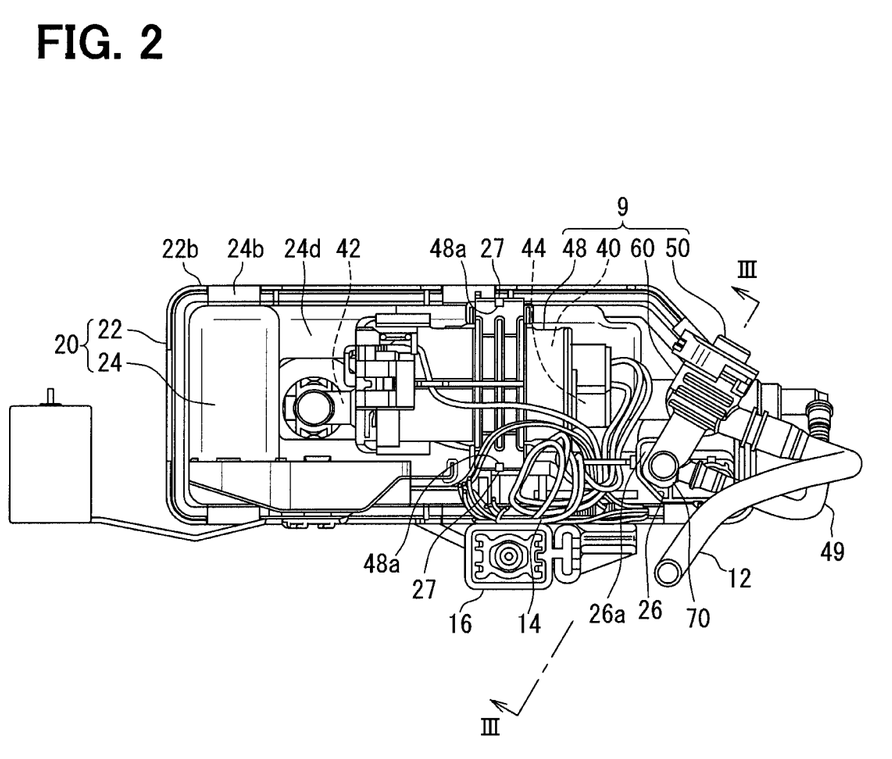
FIG. 2 is a cross-sectional view taken along line II-II in FIG. 1.
Figure 3:
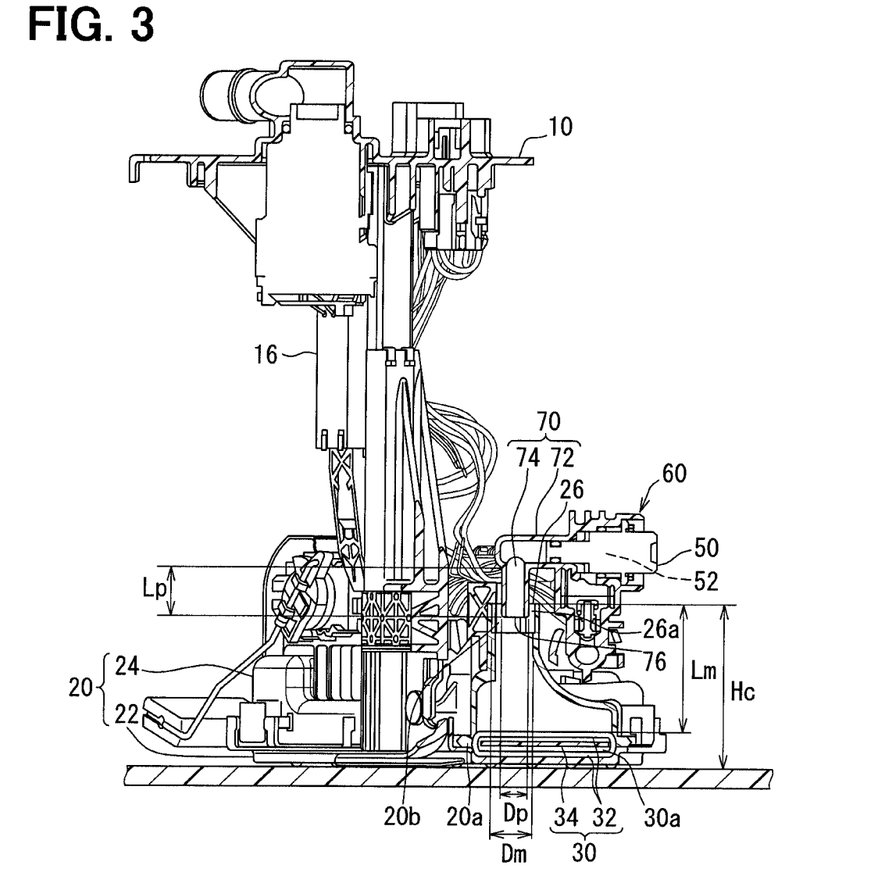
FIG. 3 is a cross-sectional view taken along line III-Ill in FIG. 2.

As shown in FIGS. 1 to 3, the fuel supply device 100 includes a closure lid 10, a coupling stay 16, a sub-tank 20, a suction filter 30, a fuel pump 40, a pressure regulator 50 and a regulator holder 60 having a fuel recovery passage portion 70.

The closure lid 10 is made of resin and is shaped into a circular plate form. The closure lid 10 is placed at the upper wall 2 of the fuel tank 1 and closes the insertion hole 2a. The closure lid 10 integrally has a fuel supply pipe 12 and an electrical connector 14. The fuel supply pipe 12 is communicated with the pressure regulator 50 in the inside of the fuel tank 1. The fuel supply pipe 12 is communicated with a fuel path that extends from the fuel tank to the internal combustion engine at the outside of the fuel tank. The electrical connector 14 receives a plurality of metal terminals. Each metal terminal is electrically connected to, for example, the fuel pump 40 or a fuel level sensing device 80. Furthermore, each metal terminal is electrically connected to a control circuit system, such as an ECU, at the outside of the fuel tank 1.

The coupling stay 16 is received in the inside of the fuel tank 1. The coupling stay 16 couples between the closure lid 10 and the sub-tank 20. The coupling stay 16 includes an upper stay 17, a lower stay 18 and a resilient member 19.

The upper stay 17 includes an upper tube segment 17a and an upper column segment 17b, which are combined together in one piece to form the upper stay 17. The upper tube segment 17a is made of resin and is shaped into a rectangular tubular form that extends in the top-to-bottom direction. The upper tube segment 17a downwardly extends from the closure lid 10. The upper column segment 17b is made of resin and is shaped into a rectangular column form that extends in the top-to-bottom direction. The upper column segment 17b downwardly extends from the closure lid 10.

The lower stay 18 includes a rotatable plate segment 18a, a lower column segment 18b and a lower tube segment 18c, which are combined together in one piece to form the lower stay 18. The rotatable plate segment 18a is made of resin and is shaped into a flat plate form that extends in both the top-to-bottom direction and a transverse direction. The rotatable plate segment 18a is coupled to a lateral wall 24a of the sub-tank 20 such that the rotatable plate segment 18a is rotatable about a rotational axis Ar that extends in another transverse direction at the sub-tank 20. Specifically, at the time of installing the fuel supply device 100 into the fuel tank 1, the sub-tank 20 is placed in a reference rotational position relative to the coupling stay 16. Then, after the installation of the fuel supply device 100 into the fuel tank 1, the sub-tank 20 is placed in an operating rotational position Ru relative to the coupling stay 16.

The lower column segment 18b is made of resin and is shaped into a rectangular column form that extends in the top-to-bottom direction. The lower column segment 18b is slidably fitted into the upper tube segment 17a from the lower side of the upper tube segment 17a. The lower tube segment 18c is made of resin and is shaped into a rectangular tubular form that extends in the top-to-bottom direction. The upper column segment 17b is slidably fitted into the lower tube segment 18c from the upper side of the lower tube segment 18c.

The resilient member 19 is made of metal and is shaped into a form of a coil spring. The resilient member 19 is received such that the resilient member 19 extends in both of the inside of the upper tube segment 17a and the inside of the lower column segment 18b, so that the resilient member 19 is clamped between the upper tube segment 17a and the lower column segment 18b. In the state where the resilient member 19 is engaged to the upper tube segment 17a, the resilient member 19 exerts a restoring force against the lower column segment 18b in a downward direction. Each of projections 22a of a bottom portion 20a of the sub-tank 20 is urged against a bottom wall 3 of the fuel tank 1 by this restoring force. Therefore, a relative position between the upper stay 17 and the lower stay 18 changes in response to expansion and contraction of the fuel tank 1, so that a breakage of the coupling stay 16 is limited.

The sub-tank 20 includes a lower plate member 22 and an upper cover member 24, which are assembled together in a form of a planar hollow box. The lower plate member 22 is placed at the bottom portion 20a of the sub-tank 20. The lower plate member 22 is made of resin and is shaped into a flat plate form. The lower plate member 22 includes a plurality of lower inflow holes 22c that extend through the lower plate member 22 in the top-to-bottom direction. Furthermore, the lower plate member 22 includes a plurality of projections 22a that downwardly project at the outside of the sub-tank 20. The respective projections 22a ensure formation of an inflow gap 3a between the lower plate member 22 and the bottom wall 3 of the fuel tank 1. The fuel of the fuel tank flows into the inside of the sub-tank 20 through the inflow gap 3a and the lower inflow holes 22c.

The upper cover member 24 includes a ceiling portion 20b that forms a ceiling of the inside space of the sub-tank 20. The upper cover member 24 is made of resin and is shaped in a form of a cover. At an outer periphery of the upper cover member 24, the lateral wall 24a, which extends in the top-top-to-bottom direction, and a plurality of engaging claws 24b, which project from the lateral wall 24a, are formed. When the engaging claws 24b are respectively engaged to a plurality of engaging portions 22b, which are formed at an outer periphery of the lower plate member 22, the upper cover member 24 is assembled to the lower plate member 22. The upper cover member 24 includes an upper inflow hole 24c that extends through a portion of the upper cover member 24 in the top-to-bottom direction. The fuel of the fuel tank 1 flows into the inside of the sub-tank 20 also through the upper inflow hole 24c. In this way, the sub-tank 20 stores the fuel, which flows into the inside of the sub-tank 20.

As shown in FIG. 3, the suction filter 30 is placed in the inside of the sub-tank 20 along the bottom portion 20a of the sub-tank 20, and the suction filter 30 is shaped into a flat bag form. The suction filter 30 includes a screen 32 and a framework portion 34. The screen 32 is shaped into a form of a bag and is made of a material, such as a porous resin, a woven fabric, an unwoven fabric, a resin mesh or a metal mesh, which has a filtering function. An outer periphery of the screen 32 is clamped between the lower member 22 and the upper cover member 24. The framework portion 34 is made of resin and is placed in the inside of the screen 32 to maintain the shape of the screen 32.

When the fuel pump 40 is operated, the fuel, which is drawn into the inside of the sub-tank 20, is filtered through the suction filter 30 and is drawn into an inside space 30a of the screen 32. The inside space 30a is communicated with a suction port 42 of the fuel pump 40, and thereby the fuel, which is filtered through the screen 32, is drawn into the inside of the fuel pump 40 through the suction port 42.

The fuel pump 40 may be any of various types of pumps, such as a vane pump, a gear pump or a centrifugal pump. As shown in FIG. 2, the fuel pump 40 is placed on the upper cover member 24 at the outside of the sub-tank 20. The fuel, which is drawn into the inside of the fuel pump 40 through the suction port 42, is discharged from the fuel pump 40 through a discharge port 44.

Figure 4:
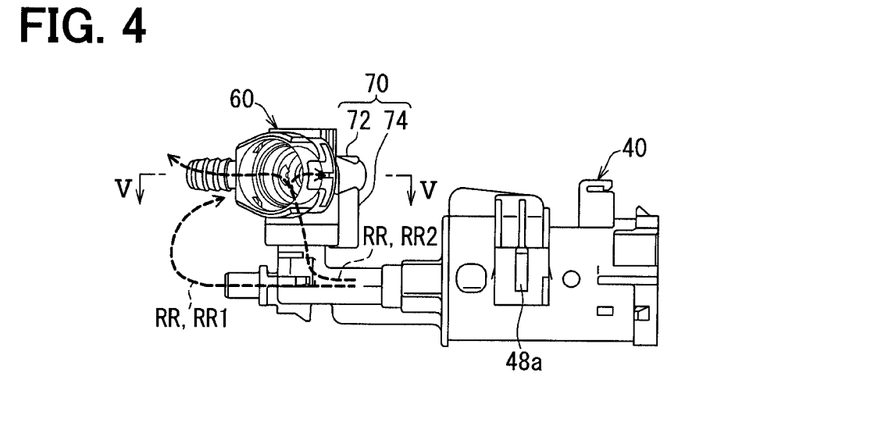
FIG. 4 is a rear view showing a regulator holder and a pump holder of FIG. 1.

As shown in FIGS. 2 to 5, because of branching of a pump holder 48, which holds the fuel pump 40, the discharged fuel is branched into a first pressure-regulation path PR1, which extends through a fuel discharge pipe 49 and reaches an inside of the regulator holder 60, and a second pressure-regulation path PR2, which directly reaches the inside of the regulator holder 60. In the first pressure-regulation path PR1, one end part of the fuel discharge pipe 49 is communicated with the discharge port 44 of the fuel pump 40, and the other end part of the fuel discharge pipe 49 is communicated with the regulator holder 60 and has an orifice in the inside of the other end part of the fuel discharge pipe 49. In the second pressure-regulation path PR2, as shown in FIG. 3, the pump holder 48 is welded to the regulator holder 60, so that the pump holder 48 is communicated with the regulator holder 60. Small windows 48a, which are shown in FIGS. 2 and 4, are formed at the pump holder 48 such that engaging projections 27, which are formed at the lateral wall 24a of the sub-tank 20, are respectively engaged to the small windows 48a.

Figure 5:
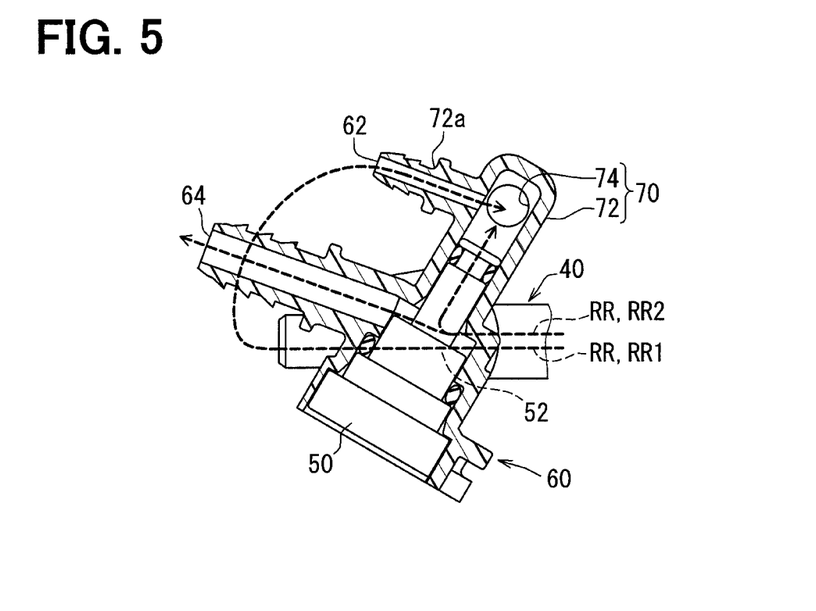
FIG. 5 is a partial cross-sectional view taken along line V-V in FIG. 4, showing a state where the pressure regulator is held.
Figure 6:
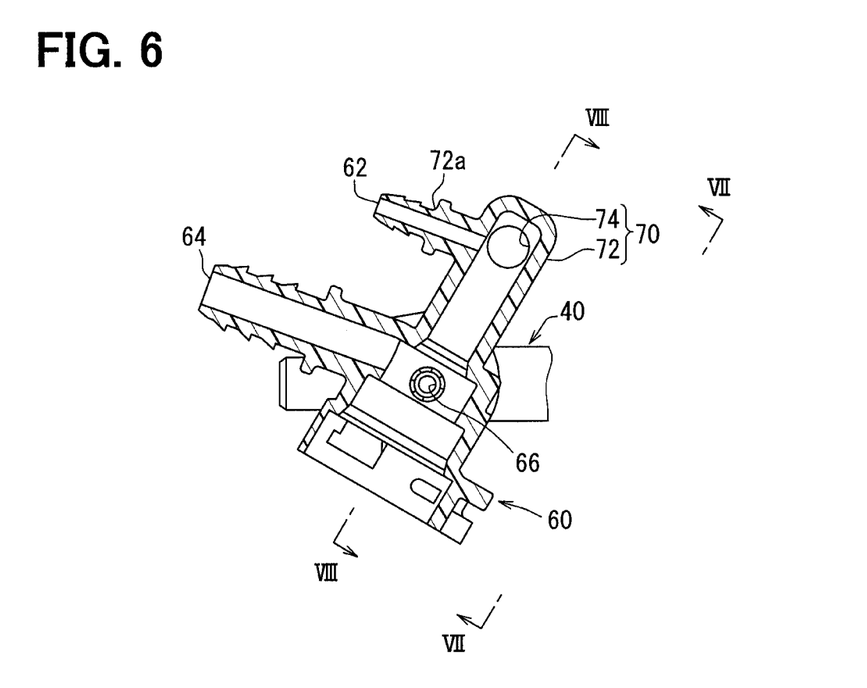
FIG. 6 is a cross-sectional view showing a state where the pressure regulator is removed from FIG. 5.
Figure 7:
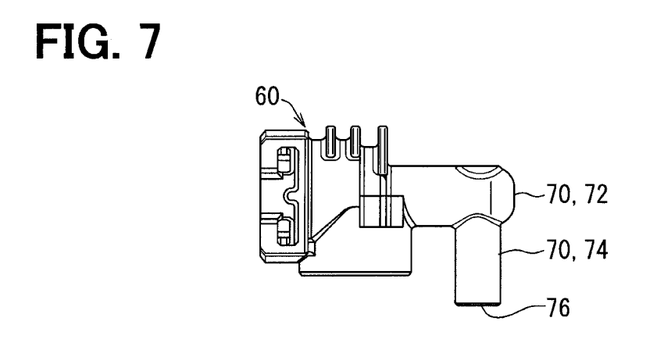
FIG. 7 is a view of the regulator holder taken in a direction of VII in FIG. 6.
Figure 8:
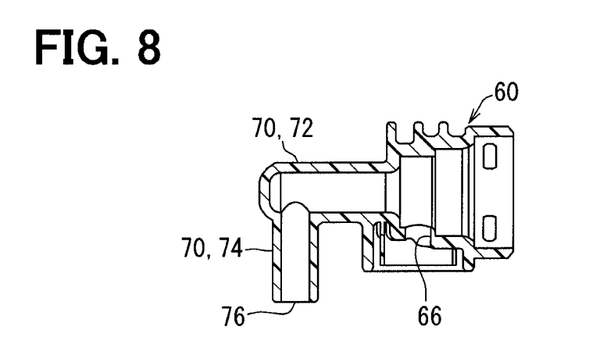
FIG. 8 is a cross-sectional view taken along line VIII-VIII in FIG. 6.

As shown in FIGS. 3 and 5, the pressure regulator 50 is placed at the outside of the sub-tank 20 and is connected to the fuel discharge pipe 49 and the fuel supply pipe 12 through the regulator holder 60. The pressure regulator 50 includes a valve element 52 that is configured to execute valve opening and valve closing thereof. In the case where the valve element 52 is placed into the valve closing state, the fuel, which passes through a communication hole 66 (see FIGS. 6 and 8) of the second pressure-regulation path, flows into the fuel supply pipe 12. In the other case where the valve element 52 is placed into the valve opening state, a portion of the fuel, which has passed through the second pressure-regulation path PR2, merges into the first pressure-regulation path PR1. A flow rate of the fuel to the fuel supply pipe 12 is adjusted in response to the valve opening and valve closing discussed above, so that the pressure regulator 50 can adjust the fuel of the pressure-regulation path RR, RR1, RR2, which is discharged from the fuel pump 40 and is fed toward the outside of the fuel tank 1.

The regulator holder 60, which is shown in FIGS. 1 to 8, is made of resin and is shaped into a hollow form. The regulator holder 60 holds the pressure regulator 50 such that the regulator holder 60 surrounds the pressure regulator 50 from the outer side of the pressure regulator 50.

The regulator holder 60 includes a discharged fuel inlet 62, which is connected to the fuel discharge pipe 49 and is placed at the outside of the sub-tank. The regulator holder 60 includes a supply fuel outlet 64, which is connected to the fuel supply pipe 12 and is placed at the outside of the sub-tank 20 at a location where the supply fuel outlet 64 is connected to the discharged fuel inlet 62 through the valve element 52 of the pressure regulator 50.

Furthermore, the regulator holder 60 includes a fuel recovery passage portion 70 at a location between the discharged fuel inlet 62 and the pressure regulator 50. The fuel recovery passage portion 70 forms a portion of the pressure-regulation path RR as a merge path, at which the first pressure-regulation path PR1 and the second pressure-regulation path PR2 are merged together. The fuel recovery passage portion 70 forms a flow passage that has a function of recovering the excess fuel, which becomes excess at the pressure-regulation path RR, to the sub-tank.

Now, a relationship between the fuel recovery passage portion 70, which is formed as the part of the regulator holder 60, and the sub-tank 20, will be described in detail.

The fuel recovery passage portion 70 includes a connection pipe portion 72 and an extension pipe portion 74, which are combined together to form the fuel recovery passage portion 70. The connection pipe portion 72 is in a form of a hollow cylindrical tube that linearly extends and intersects with an extending direction of the extension pipe portion 74. The connection pipe portion 72 connects between an end part of the extension pipe portion 74, which is located on the pressure regulator 50 side, and the pressure regulator 50 through communication. An inlet port 72a, which communicates between the connection pipe portion 72 and the discharged fuel inlet 62, extends from the connection pipe portion 72.

The extension pipe portion 74 is in a form of a hollow cylindrical tube that linearly extends and intersects with the extending direction of the connection pipe portion 72. Particularly, in the present embodiment, the extending direction of the connection pipe portion 72 and the extending direction of the extension pipe portion 74 are substantially perpendicular to each other. The extending direction of the connection pipe portion 72 is the transverse direction, and the extending direction of the extension pipe portion 74 is the vertical direction. An excess fuel outlet 76, which discharges the excess fuel, is formed at a distal end part of the extension pipe portion 74, which is opposite from an end part of the extension pipe portion 74 that is connected to the connection pipe portion 72.

At the ceiling portion 20b of the sub-tank 20, the upper cover member 24 has an opening 26 that opens to the outside of the sub-tank 20 at a location that is higher than the suction filter 30. Here, particularly, as shown in FIGS. 1 and 3, a height of the upper cover member 24, which is measured from the bottom wall 3 of the fuel tank 1 that serves as a reference position, is defined as a cover height Hc. The opening 26 is formed at a highest part of the ceiling portion 20b where the cover height Hc is the highest in the ceiling portion 20b. The opening 26 is opened such that an opening direction of the opening 26 is an upward direction. Furthermore, in the first embodiment, particularly, as shown in FIG. 1, a recess 24d, which is lower than its adjacent regions, is formed between the location, at which the opening 26 of the upper cover member 24 is formed, and the location, at which the upper inflow hole 24c is formed.

Here, as shown in FIG. 3, an outer diameter Dp of the extension pipe portion 74 is smaller than a diameter Dm of the opening 26. With this dimension relationship, the extension pipe portion 74 of the fuel recovery passage portion 70 is inserted from the outside of the sub-tank 20 into the inside of the sub-tank 20 through the opening 26 while a gap 26a is formed between the opening 26 and the extension pipe portion 74. Since the extension pipe portion 74 passes the opening 26, the excess fuel outlet 76 is located on the inner side of the opening 26 where the inside of the sub-tank 20 is located. Specifically, the excess fuel is discharged at the location that is on the inner side of the opening 26 where the inside of the sub-tank 20 is located. In a case where a surface of the fuel in the fuel tank 1 is located at a location that is higher than the location of the opening 26, the fuel flows from the inside of the fuel tank 1 into the sub-tank 20 through the gap 26a.

The extension pipe portion 74 linearly extends toward the suction filter 30 that is located on the lower side of the extension pipe portion 74. However, an extending length Lp of the extension pipe portion 74 is smaller than a distance Lm between the screen 32 of the suction filter 30 and the opening 26. Thereby, the excess fuel outlet 76 is located at the ceiling portion 20b, and the predetermined gap is maintained between the extension pipe portion 74 and the screen 32.

Figure 9:
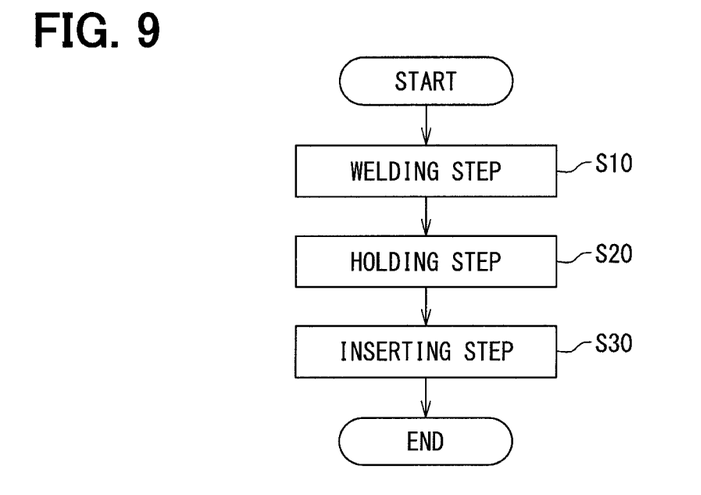
FIG. 9 is a flowchart showing a method for producing the fuel supply device according to the first embodiment.

Hereinafter, a method for producing the fuel supply device 100 will be described with reference to a flowchart shown in FIG. 9 mainly with respect to a method of installing the unit 9, which includes the regulator holder 60, to the sub-tank 20.

First of all, at a welding step S10, the regulator holder 60 and the pump holder 48 are welded together.

At a holding step S20, the pressure regulator 50 is assembled to the regulator holder 60, so that the pressure regulator 50 is held by the regulator holder 60. Similarly, the fuel pump 40 is assembled to the pump holder 48, so that the fuel pump 40 is held by the pump holder 48. In this way, the unit 9, which includes the regulator holder 60, the pressure regulator 50, the pump holder 48 and the fuel pump 40, is assembled.

At an inserting step S30, the unit 9 is assembled to the sub-tank 20 in a direction that coincides with the opening direction of the opening 26, so that the fuel recovery passage portion 70 is inserted into the opening 26 in such a manner that the excess fuel outlet 76 passes from the outside of the sub-tank 20 through the opening 26. In the present embodiment, the opening 26 upwardly opens. Therefore, by moving the unit 9 from the upper side to the lower side, the small windows 48a of the pump holder 48 are respectively engaged with the engaging projections 27 of the sub-tank 20, and thereby the unit 9 is assembled to the sub-tank 20. At the same time, since the extending direction of the extension pipe portion 74 coincides with the opening direction of the opening 26, the extension pipe portion 74 can be inserted without colliding against the opening 26. Furthermore, since the gap 26a is formed between the opening 26 and the extension pipe portion 74, press fitting is not required.

In this way, the unit 9, which includes the regulator holder 60, can be assembled to the sub-tank 20.

Effects and Advantages

Effects and advantages of the first embodiment discussed above will be described hereinafter.

According to the first embodiment, the fuel recovery passage portion 70 includes the excess fuel outlet 76 that discharges the excess fuel and is located on the inner side of the opening 26 where the inside of the sub-tank 20 is placed. With the excess fuel outlet 76 discussed above, it is possible to limit scattering of the excess fuel, which is discharged from the fuel pump 40 toward the outside of the fuel tank 1 and becomes excess at the pressure-regulation path RR, at the outside of the sub-tank 20, and thereby it is possible to efficiently recover the excess fuel into the inside of the sub-tank 20. In addition, the discharge of the excess fuel from the excess fuel outlet 76 is implemented in the state where the fuel recovery passage portion 70 is inserted into the opening 26 from the outside of the sub-tank 20 while the gap 26a is formed between the excess fuel outlet 76 and the opening 26. Therefore, even when the vapor contained in the excess fuel is discharged into the inside of the sub-tank 20, it is possible to expel the vapor to the outside of the sub-tank 20 through the gap 26a. Specifically, it is possible to limit the suctioning of the vapor into the fuel pump 40 through the suction filter 30. Therefore, it is possible to provide the fuel supply device 100 that has the high stability with respect to the fuel supply.

Furthermore, according to the first embodiment, the fuel recovery passage portion 70 is formed as the part of the regulator holder 60. Therefore, it is possible to provide the fuel supply device, which has the high stability with respect to the fuel supply, while an increase in the number of the components is limited.

Furthermore, according to the first embodiment, the opening 26 and the excess fuel outlet 76 are located at the ceiling portion 20b of the sub-tank 20. When the opening 26 is located at the ceiling portion 20b, the vapor, which has a small specific gravity, can be easily expelled to the outside of the sub-tank 20 through the gap 26a. Furthermore, when the excess fuel outlet 76 is located at the ceiling portion 20b, it is less likely to happen that the vapor is forced into the suction filter 30, which is placed along the bottom portion 20a of the sub-tank 20. Thus, it is possible to limit the suctioning of the vapor into the fuel pump 40 once again. Thereby, it is possible to provide the fuel supply device 100 that has the high stability with respect to the fuel supply.

Furthermore, according to the first embodiment, the opening 26 is formed at the highest part of the upper cover member 24 where the cover height Hc is the highest in the upper cover member 24. With this configuration, the vapor, which has the small specific gravity, tends to be collected at the opening 26, so that the vapor can be easily expelled to the outside of the sub-tank through the gap 26a.

Furthermore, according to the first embodiment, the extending length Lp of the extension pipe portion 74 is smaller than the distance Lm between the suction filter 30 and the opening 26. In the case where each corresponding element is configured to implement the above distance relationship, even if the extension pipe portion 74 is moved, the connection pipe portion 72, which extends in the direction that is perpendicular to the extending direction of the extension pipe portion 74, functions as a stopper against the movement of the extension pipe portion 74. Therefore, it is possible to reliably provide the space between the excess fuel outlet 76 and the suction filter 30. Thus, it is possible to limit the collision between the excess fuel outlet 76 and the suction filter 30, which is caused by, for example, the vibrations of the vehicle.

Furthermore, according to the producing method of the first embodiment, the unit 9, which includes the regulator holder 60, is assembled to the sub-tank 20 in the direction that coincides with the opening direction of the opening 26. In this way, the fuel recovery passage portion 70 is inserted such that the excess fuel outlet 76 is inserted from the outside of the sub-tank 20 into the inside of the sub-tank 20 through the opening 26. The placement of the pressure regulator 50 relative to the sub-tank 20 and the placement of the excess fuel outlet 76 relative to the sub-tank 20 can be implemented by the assembling in the single direction. Therefore, the fuel supply device 100, which has the high stability with respect to the fuel supply, can be easily provided.

Second Embodiment

Figure 10:
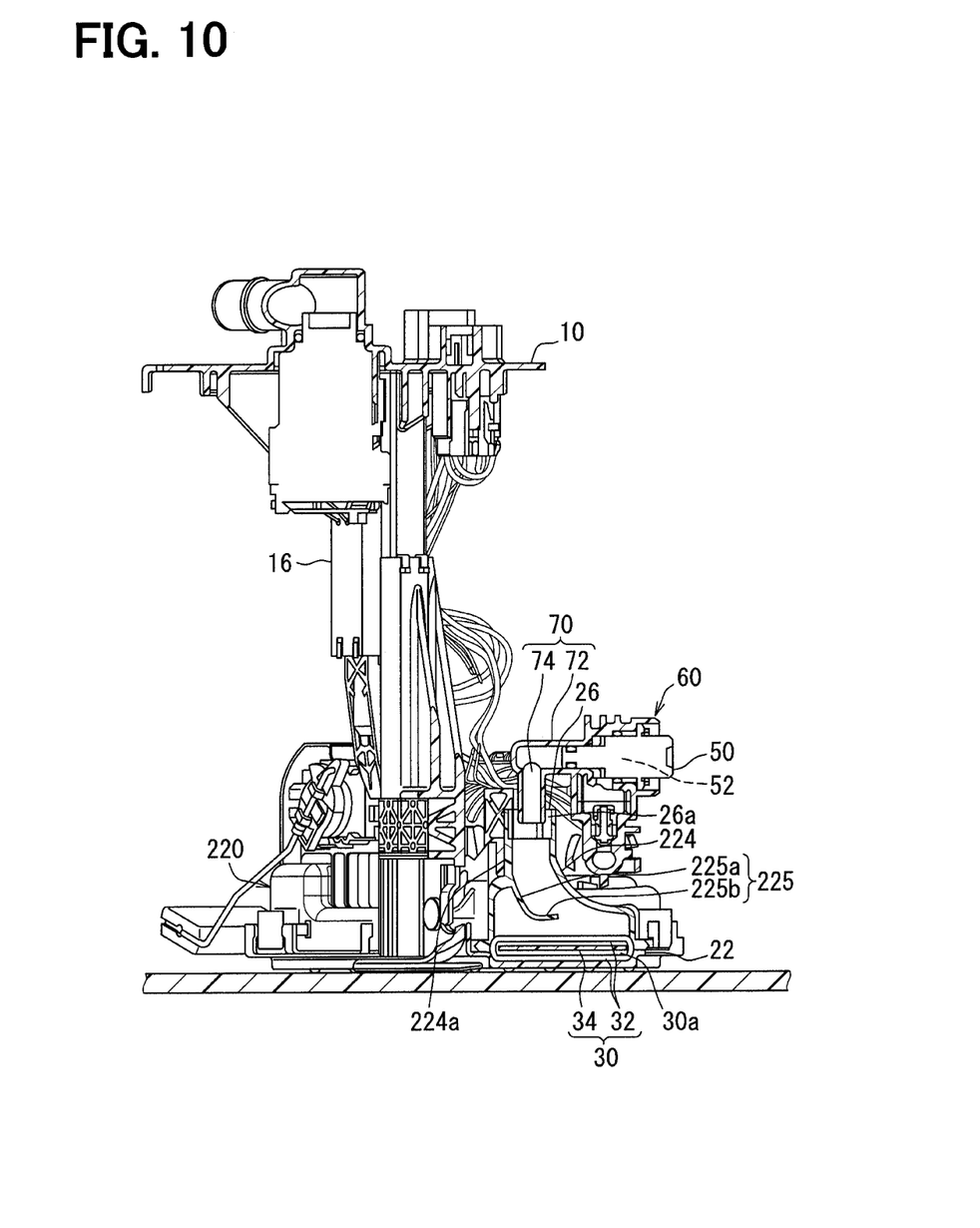
FIG. 10 is a view that corresponds to FIG. 3 according to a second embodiment.

As shown in FIG. 10, a second embodiment of the present disclosure is a modification of the first embodiment. The second embodiment will be described mainly with respect to differences relative to the first embodiment.

The sub-tank 220 of the second embodiment includes a receiving portion 225 that projects from a peripheral wall 224a of the sub-tank 220, which is formed as a part of the upper cover member 224, into the inside of the sub-tank 220. The receiving portion 225 is placed between the excess fuel outlet 76 and the suction filter 30 and thereby receives the excess fuel, which is discharged and is dropped from the excess fuel outlet 76.

Specifically, the receiving portion 225 of the second embodiment is formed integrally with the upper cover member 224 in one piece from resin such that the receiving portion 225 is in a form of a thin wall. The receiving portion 225 includes a tilt wall part 225a and a distal end wall part 225b. The tilt wall part 225a is joined to the peripheral wall 224a and is tilted such that the tilt wall part 225a progressively downwardly tilts toward the distal end wall part 225b. The distal end wall part 225b is joined to the tilt wall part 225a and forms a distal end part of the receiving portion 225. The distal end wall part 225b extends in the transverse direction generally in parallel with, for example, the suction filter 30, so that the distal end wall part 225b is shaped generally into a planar form.

When the excess fuel is discharged from the excess fuel outlet 76, the tilt wall part 225a and the distal end wall part 225b receives the excess fuel. A portion of the excess fuel, which has the reduced momentum that is reduced in the above-described manner, flows downward along the tilt wall part 225a, so that the portion of the excess fuel is guided to the screen 32 of the suction filter 30.

According to the second embodiment described above, the sub-tank 220 includes the receiving portion 225, which is placed between the excess fuel outlet 76 and the suction filter 30 and receives the excess fuel discharged from the excess fuel outlet 76. Because of the provision of the receiving portion 225, the excess fuel, which is discharged from the excess fuel outlet 76, less likely directly collide against the suction filter 30, so that it is possible to reduce an intrusion velocity of the excess fuel into the suction filter 30. Thus, it is possible to limit the forced entry of vapor contained in the excess fuel into the inside space 30a of the suction filter 30.

Third Embodiment

Figure 11:
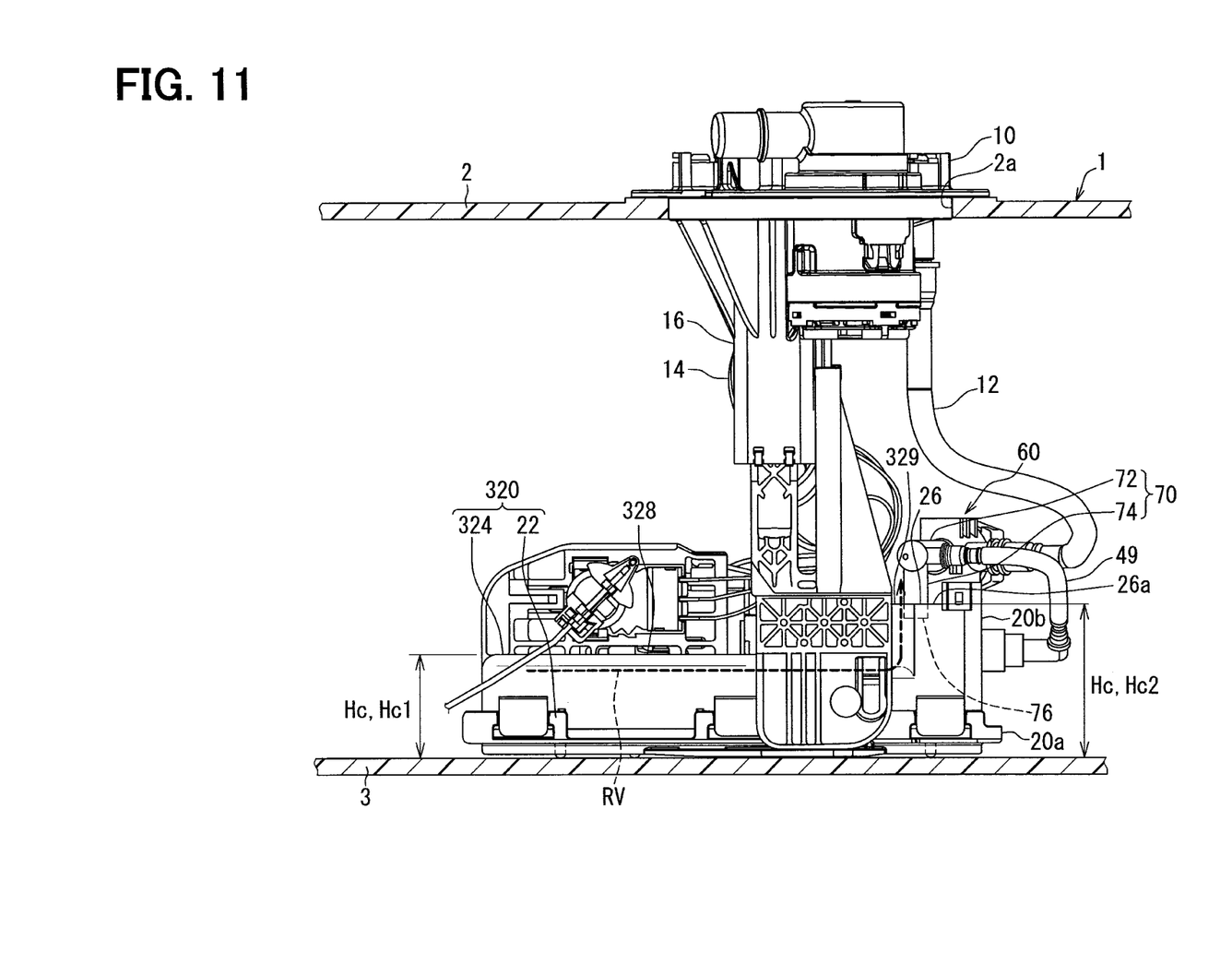
FIG. 11 is a view that corresponds to FIG. 1 according to a third embodiment.

As shown in FIG. 11, a third embodiment of the present disclosure is a modification of the first embodiment. The third embodiment will be described mainly with respect to differences relative to the first embodiment.

In the sub-tank 320 of the third embodiment, the opening 26 is located at the ceiling portion 20b of the sub-tank 320 and is formed at the upper cover member 324.

However, the upper inflow hole 24c is not formed at the sub-tank 320 of the third embodiment unlike the first embodiment. Therefore, in the ceiling portion 20b, there is no communicating part, which communicates between the inside and the outside of the sub-tank 320, except the gap 26a that is formed between the opening 26 and the fuel recovery passage portion 70.

Furthermore, unlike the first embodiment, the recess 24d is not formed at the upper cover member 324 unlike the first embodiment. Therefore, the upper cover member 324 includes: a flat portion 328, which has the cover height Hc, Hc1 that is generally constant; and a high portion 329, which has the cover height Hc, Hc2 that is higher than the cover height Hc, Hc1 of the flat portion 328. The opening 326 is formed at a highest part of the high portion 329 that has the cover height Hc, which is the highest in the high portion 329.

Because of the above-described configuration of the upper cover member 324, a vapor expelling path RV is formed such that the vapor expelling path RV extends from a given point of the upper cover member 324 to the opening 26 along the upper cover member 324 while the vapor expelling path RV extends via a part of the ceiling portion 20b that is located at or higher than the cover height HO measured at the given point. In FIG. 11, an example of the vapor expelling path RV is indicated by a dotted line.

According to the third embodiment discussed above, there is provided the vapor expelling path that extends only along the part of the ceiling portion 20b, which is located at or higher than the cover height HC. Therefore, the vapor, which has the small specific gravity, tends to gather more easily in the opening 26 and is more easily discharged to the outside of the sub-tank 320 through the gap 26a.

Other Embodiments

Although the embodiments of the present disclosure have been described, the present disclosure should not be limited to the above embodiments and may be applied to various other embodiments and combinations of the embodiments without departing form the scope of the present disclosure.

Figure 12:
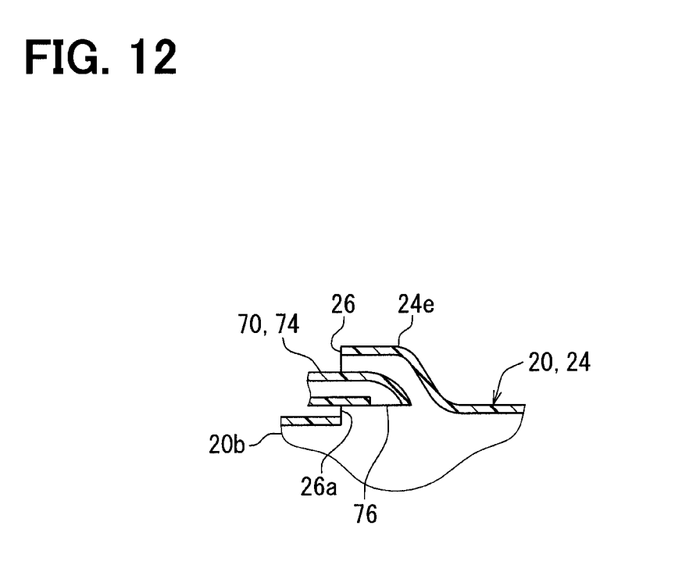
FIG. 12 is a cross-sectional view partially showing an area around a fuel recovery passage portion in a first modification.

Specifically, as a first modification, the sub-tank 20 and the fuel recovery passage portion 70 may have a structure shown in FIG. 12. In FIG. 12, at the upper cover member 24 of the sub-tank 20, which has a protrusion 24e that protrudes upwardly, the opening 26 is formed at a side surface of the protrusion 24e such that the opening 26 is opened in the opening direction that is the transverse direction. In contrast, the extension pipe portion 74 of the fuel recovery passage portion 70 extends in the extending direction that is the transverse direction.

The extension pipe portion 74 is inserted from the outside of the sub-tank 20 into the inside of the sub-tank 20 through the opening 26 such that the gap 26a is formed between the extension pipe portion 74 and the opening 26, so that the excess fuel outlet 76 releases the excess fuel on the inner side of the opening 26 where the inside of the sub-tank 20 is located. Here, the excess fuel outlet 76 is directed in a downward direction that is different from the extending direction of the extension pipe portion 74 to downwardly release the excess fuel.

In the case of the structure of FIG. 12, at the inserting step S30, since the opening 26 opens in the transverse direction, it is desirable that the unit 9, which includes the regulator holder 60, is assembled to the sub-tank 20 by moving the unit 9 in the transverse direction.

As a second modification with respect to the second embodiment, the receiving portion 225 may be formed in a cup form at a location between the excess fuel outlet 76 and the suction filter 30.

As a third modification of the second embodiment, the receiving portion 225 may be an additional filter screen that is placed between the excess fuel outlet 76 and the suction filter 30 separately from the screen 32 of the suction filter 30 and can pass the excess fuel through the additional filter screen.

As a fourth modification, the fuel recovery passage portion 70 may be formed separately from the regulator holder 60.

As a fifth modification, the opening 26 may be placed on a lower side of the highest part of the upper cover member 24 where the cover height Hc is the highest in the upper cover member 24.

As a sixth modification, the suction filter 30 may be placed at the outside of the sub-tank 20 as long as the suction filter 30 is placed along the bottom portion 20a of the sub-tank 20. As an example of this modification, with respect to the sub-tank 20 that includes the lower plate member 22, which has the through-hole that penetrates through the lower plate member 22 to conduct the excess fuel through the through-hole, the suction filter 30 may be placed adjacent to the lower plate member 22 on the lower side of the lower plate member 22.

As a seventh modification, the first pressure-regulation path PR1 may be eliminated, and thereby the fuel discharge pipe 49 and the discharged fuel inlet 62 may be eliminated.

The invention claimed is:
1. A fuel supply device configured to supply fuel, which is present in a fuel tank of a vehicle, to an outside of the fuel tank, the fuel supply device comprising:
   a sub-tank that stores the fuel;
   a suction filter that is placed along a bottom portion of the sub-tank and filters the fuel;
   a fuel pump that suctions the fuel, which is filtered through the suction filter;
   a fuel supply pipe that is located at an outside of the sub-tank and supplies the fuel, which is discharged from the fuel pump, to the outside of the fuel tank; and
   a fuel recovery passage portion that recovers excess fuel, which is discharged from the fuel pump but is not supplied to the outside of the fuel tank, to the sub-tank, wherein:
   the sub-tank has an opening that opens to the outside of the sub-tank at a location that is higher than the suction filter;
   due to a state where the fuel recovery passage portion is downwardly inserted in a vertical direction from the outside of the sub-tank into an inside of the sub-tank while a gap is interposed between the fuel recovery passage portion and the opening, the fuel recovery passage portion has an excess fuel outlet that dis- charges the excess fuel at a location that is on an inner side of the opening where the inside of the sub-tank is place; and the gap is formed between an outer peripheral wall of the fuel recovery passage portion and an inner peripheral wall of the opening and is configured to release vapor, which is contained in the excess fuel discharged from the excess fuel outlet, to the outside of the sub-tank through the gap.

2. The fuel supply device according to claim 1, wherein the opening and the excess fuel outlet are placed at a ceiling portion of the sub-tank.

3. The fuel supply device according to claim 2, wherein the sub-tank includes a receiver that is placed between the excess fuel outlet and the suction filter and receives the excess fuel discharged from the excess fuel outlet.

4. The fuel supply device according to claim 2, wherein:
the sub-tank includes an upper cover member that forms the opening at the ceiling portion;
a cover height is defined as a height of the upper cover member relative to a bottom wall of the fuel tank; and
the opening is formed at a part of the ceiling portion where the cover height is highest in the ceiling portion.

5. The fuel supply device according to claim 4, comprising a vapor expelling path that extends from a given point of the upper cover member to the opening along the upper cover member while the vapor expelling path extends via only a part of the ceiling portion that is located at or higher than the cover height measured at the given point.

6. The fuel supply device according to claim 1, further comprising a pressure regulator that is placed at the outside of the sub-tank and regulates a pressure of the fuel of a pressure-regulation path, which is discharged from the fuel pump and is fed toward the outside of the fuel tank.

7. The fuel supply device according to claim 6, further comprising a regulator holder that holds the pressure regulator, wherein the fuel recovery passage portion is formed as a part of the regulator holder.

8. The fuel supply device according to claim 6, wherein:
the fuel recovery passage portion includes:
an extension pipe portion that forms the excess fuel outlet and linearly extends toward the suction filter through the opening; and
a connection pipe portion that extends to cross an extending direction of the extension pipe portion while the connection pipe portion connects between an end part of the extension pipe portion, which is located on a side where the pressure regulator is placed, and the pressure regulator; and
an extending length of the extension pipe portion is smaller than a distance between the suction filter and the opening.

9. The fuel supply device according to claim 6, wherein the fuel recovery passage portion recovers the excess fuel, which is discharged from the fuel pump and becomes excess at the pressure-regulation path, to the sub-tank.

10. The fuel supply device according to claim 1, comprising a deflector that is configured to deflect a flow direction of the excess fuel, which flows in the vertical direction in a downstream part of the fuel recovery passage portion located at the inside of the sub-tank, to limit collision of the excess fuel discharged from the downstream part of the fuel recovery passage portion against a portion of the suction filter, which is located directly below the downstream part of the fuel recovery passage portion in the vertical direction.

11. A method for producing a fuel supply device that is configured to supply fuel, which is present in a fuel tank of a vehicle, to an outside of the fuel tank, the fuel supply device including:
a sub-tank that stores the fuel;
a suction filter that is placed along a bottom portion of the sub-tank and filters the fuel;
a fuel pump that suctions the fuel, which is filtered through the suction filter;
a pressure regulator that is placed at an outside of the sub-tank and regulates a pressure of the fuel of a pressure-regulation path discharged from the fuel pump and is fed toward the outside of the fuel tank; and
a regulator holder that includes a fuel recovery passage portion, wherein the fuel recovery passage portion recovers excess fuel, which becomes excess at the pressure-regulation path, to the sub-tank, and the regulator holder holds the pressure regulator, wherein:
the sub-tank has an opening that opens at a location, which is higher than the suction filter; and
the fuel recovery passage portion has an excess fuel outlet that discharges the excess fuel at a location that is on an inner side of the opening where an inside of the sub-tank is placed, the method comprising:
a holding step of holding the pressure regulator with the regulator holder by assembling the pressure regulator to the regulator holder; and
an inserting step of inserting the fuel recovery passage portion through the opening such that a unit, which includes the regulator holder, is assembled to the sub-tank in a direction that coincides with an opening direction of the opening, so that the excess fuel outlet is inserted from the outside of the sub-tank into an inside of the sub-tank through the opening.

12. A fuel supply device configured to supply fuel, which is present in a fuel tank of a vehicle, to an outside of the fuel tank, the fuel supply device comprising:
a sub-tank that stores the fuel;
a suction filter that is placed along a bottom portion of the sub-tank and filters the fuel;
a fuel pump that suctions the fuel, which is filtered through the suction filter;
a pressure regulator that is placed at an outside of the sub-tank and regulates a pressure of the fuel of a pressure-regulation path, which is discharged from the fuel pump and is fed toward the outside of the fuel tank; and
a fuel recovery passage portion that recovers excess fuel, which becomes excess at the pressure-regulation path, to the sub-tank, wherein:
the sub-tank has an opening that opens to the outside of the sub-tank at a location that is higher than the suction filter;
due to a state where the fuel recovery passage portion is inserted from the outside of the sub-tank into an inside of the sub-tank while a gap is interposed between the fuel recovery passage portion and the opening, the fuel recovery passage portion has an excess fuel outlet that discharges the excess fuel at a location that is on an inner side of the opening where the inside of the sub-tank is placed; and
the fuel supply device further comprises a regulator holder that holds the pressure regulator, wherein the fuel recovery passage portion is formed as a part of the regulator holder.

* * * * *